United States Patent [19]

Draus

[11] Patent Number: 5,170,656
[45] Date of Patent: Dec. 15, 1992

[54] PIPELINE FLOWMETER PROVER CONTROL SYSTEM AND METHOD

[75] Inventor: Edward T. Draus, Walsenburg, Colo.

[73] Assignee: Atlantic Richfield Company, Los Angeles, Calif.

[21] Appl. No.: 643,973

[22] Filed: Jan. 22, 1991

[51] Int. Cl.$^5$ .............................................. G01F 25/00
[52] U.S. Cl. ......................................................... 73/3
[58] Field of Search ............................................... 73/3

[56] References Cited

U.S. PATENT DOCUMENTS

| | | | |
|---|---|---|---|
| 3,120,118 | 2/1964 | Boyle | 73/3 |
| 3,271,994 | 9/1966 | Fournier et al. | 73/3 |
| 3,888,106 | 6/1975 | Last et al. | 73/3 |
| 3,955,399 | 5/1976 | Neal | 73/3 |
| 4,962,666 | 10/1990 | Adney et al. | 73/3 |
| 4,996,869 | 3/1991 | Cohrs et al. | 73/3 |

*Primary Examiner*—Hezron E. Williams
*Assistant Examiner*—George Dombroske
*Attorney, Agent, or Firm*—Michael E. Martin

[57] ABSTRACT

A reciprocable piston and cylinder type flowmeter prover is calibrated by providing a liquid conducting manifold for conducting liquid to one chamber formed by the cylinder and piston while displacing fluid from the other chamber to a measuring tank, and vice versa. The prover includes a controller having sensors which sense the movement of the piston between its first and second positions and a controller interface is provided between the prover controller and a solenoid-operated valve to provide selective control over the operation of the valve while measuring prover piston displacement in both directions. Visual and audio indicators are interconnected in a controller circuit which indicates the condition of the prover during the calibration process and receives signals from the controller interface for operating the valve.

7 Claims, 2 Drawing Sheets

PIPELINE FLOWMETER PROVER CONTROL SYSTEM AND METHOD

BACKGROUND OF THE INVENTION

Field of the Invention

The present invention pertains to an improved control system and method for operating a pipeline flowmeter prover for calibrating the accuracy of the flowmeter prover. In process and transport pipeline systems, it is required, from time to time, to verify the accuracy of in-line flowmeters. To this end, devices known as flowmeter provers are provided, usually permanently connected to the pipeline circuit in an arrangement with the flowmeter whereby the flowmeter may be calibrated without taking the line out of service. This type of flowmeter calibration device or "prover" is commercially available, and one source is the Brooks Instrument Division of Emerson Electric Company, Statesboro, Georgia, which manufactures a prover known as the Brooks Compact Prover.

However, it is also necessary, from time to time, to calibrate the flowmeter prover itself. Heretofore, methods and equipment available for calibrating flowmeter provers have been cumbersome and time-consuming and not conducive to accurate calibration of the prover. The installation of many flowmeter provers is such as to require calibration of these devices in harsh environmental conditions. Factors such as the time required to modify the prover and prepare it for calibration, and the calibration process itself, have led to errors in the calibration process. The present invention is directed to overcoming the deficiencies of the prior art with an improved flowmeter prover calibration control system and method which will be appreciated by reading the disclosure which follows in conjunction with the drawing.

SUMMARY OF THE INVENTION

The present invention provides an improved calibration system and method for calibrating an in-line type flowmeter prover. In accordance with one aspect of the present invention, a portable control unit is provided for operating a flowmeter prover for calibrating the flow measurement capability of the prover in both upstream and so-called downstream operating modes and whereby the measured quantity of fluid used in calibrating the prover is more easily and accurately obtained.

In accordance with another aspect of the present invention, there is provided a control system for a flowmeter prover calibration process which enables more rapid and accurate operation of the prover during the calibration process. In accordance with yet a further aspect of the invention, there is provided a method for calibrating a flowmeter prover which offers improved control over the calibration process.

Those skilled in the art will further appreciate the advantages and superior features of the present invention upon reading the detailed description which follows in conjunction with the drawing.

DESCRIPTION OF A PREFERRED EMBODIMENTS

Figure 1A:
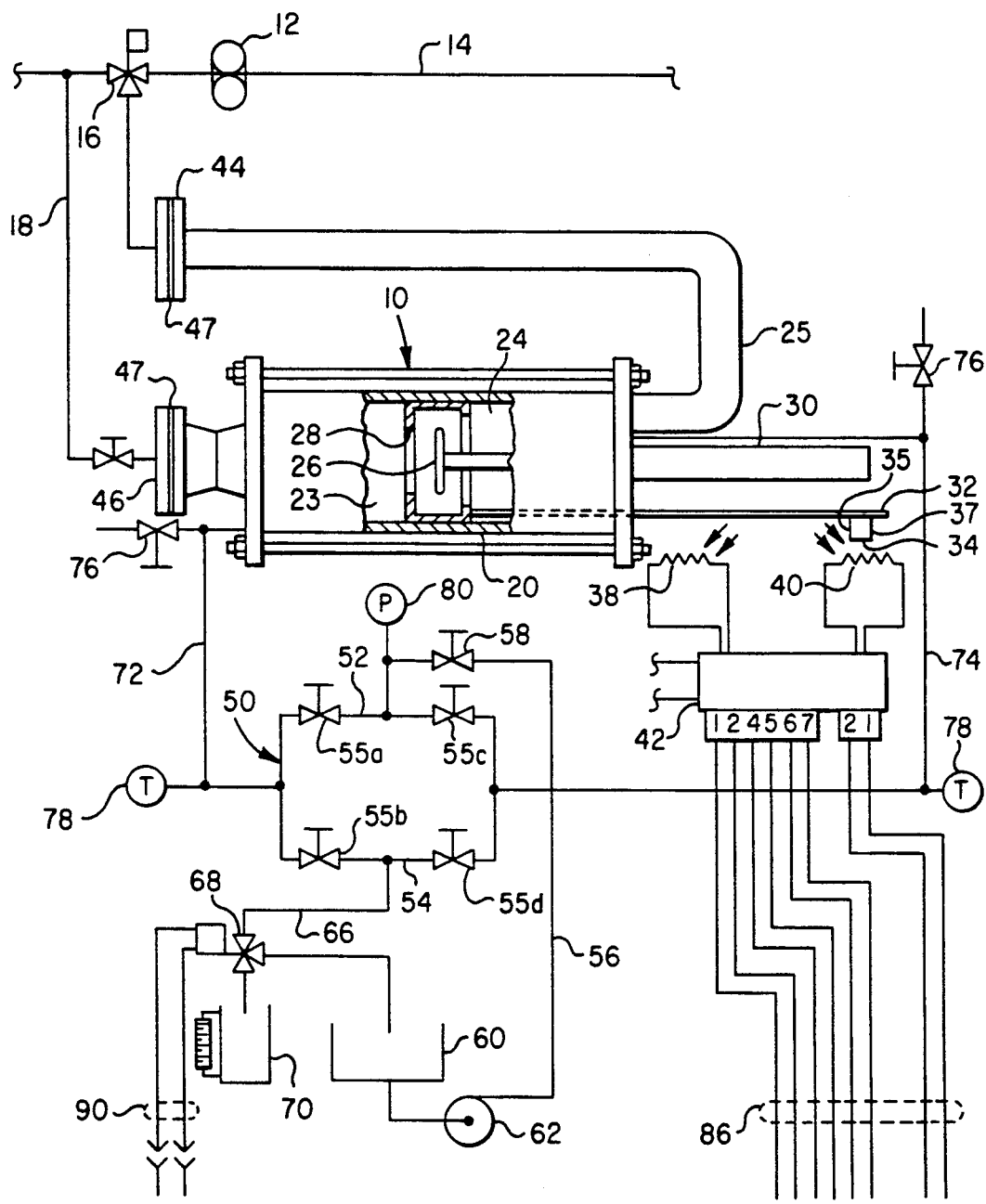
FIGS. 1a and 1b comprise a schematic diagram of a flowmeter prover and calibration control system in accordance with the present invention.
Figure 1B:
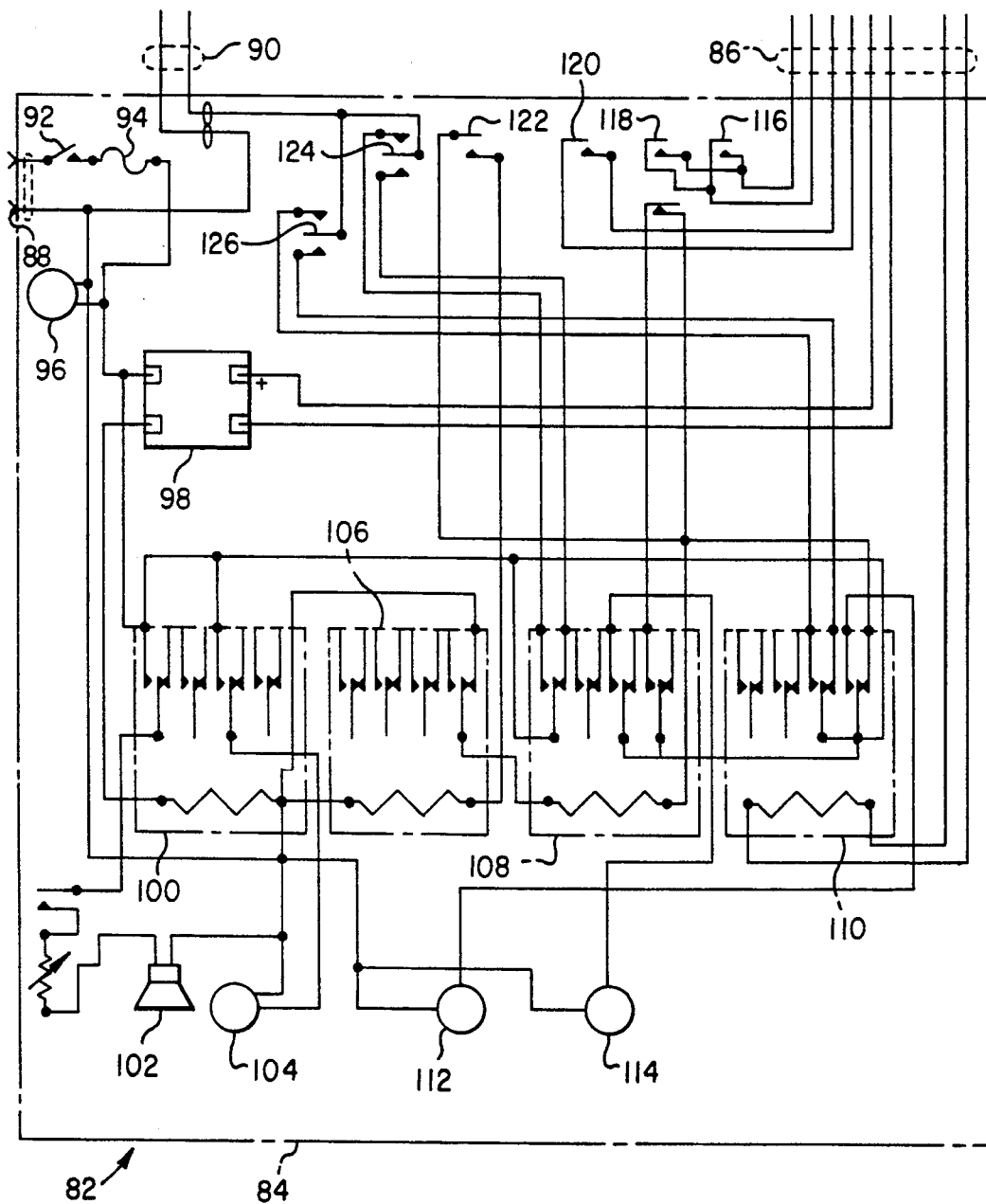

In the description which follows, like parts are marked throughout the specification and drawing with the same reference numerals, respectively. The drawing figure is not to scale, and most of the elements are shown in schematic form in the interest of clarity and conciseness. FIGS. 1a and 1b are intended to be reviewed together as a single diagram.

Referring to the drawing (FIG. 1a), there is illustrated in somewhat schematic form a flowmeter prover, generally designated by the numeral 10, of a type commercially available and known as a Brooks Compact prover, manufactured by the Brooks Instrument Division of Emerson Electric Company, Statesboro, Georgia. The flowmeter prover 10 is adapted to be used to calibrate the accuracy of a pipeline flowmeter 12 interposed in a liquid transmission pipeline 14. In typical operation of the prover 10 to calibrate the flowmeter 12, pipeline flow is diverted through a valve 16 to the prover, which is of a type operable to calibrate the flowmeter without interrupting pipeline flow. When the prover 10 is operated to calibrate the flowmeter 12, the flow is diverted through the prover by way of the valve 16 and returns to the pipeline through a conduit 18 having a suitable shutoff valve 19.

The prover 10 includes a cylinder member 20 in which is disposed a hollow piston 22 which, in combination with the cylinder, defines a calibration flow chamber 24. A power-operated poppet valve 26 is operable to close over an opening 28 in the piston 22 so that, as flow is introduced into the chamber 24 by way of an inlet conduit 25, the piston 22 is moved to expand the chamber, such movement being to the left, viewing the drawing figure. As the piston 22 moves to its maximum chamber volume position, an actuator 30 operates to move the poppet valve 26 to permit flow out of the prover through a chamber 23 and the discharge conduit 18 and back into the transmission line 14. In this way, the prover 10 may be operated to calibrate the flowmeter 12 without interrupting pipeline flow.

The piston 22 is connected to a position-sensing rod 32, having a flag member 34 disposed thereon with opposed edges 35 and 37 which are operable to effect generation of electrical signals through spaced-apart photosensors 38 and 40. The photosensors 38 and 40 are suitably interconnected with a prover controller unit 42. As the rod 32 moves with the piston 22, such as during a flowmeter or prover calibration operation, the known displacement volume of the chamber 24, which increases as the flag 34 moves from the sensor 40 to the sensor 38, is determined for a measured period of time. The time period measured is determined by the elapsed time of movement of the flag 34 between the sensors 40 and 38. Accordingly, the prover 10 may be operated without interrupting flow in the pipeline 14 to calibrate the liquid flow rate being measured by the meter 12 by comparing the displaced volume of the chamber 24 over a measured period of time with the flow rate indicated by controls, not shown, of the flowmeter 12.

From time to time, of course, the prover 10 must itself be calibrated. This process is sometimes known in the art as the performance of a "water-draw" process. Prior to initiating the prover calibration or "water-draw" process, the prover 10 is isolated from the pipeline 14 by disconnecting the flanged connections 44 and 46 and inserting blind flange members 47 in the connections to prevent flow to and from the prover 10 by way of the conduits 18 and 25. During calibration of the prover 10, the volume of the prover chambers 23 and 24 is measured by displacing water from the chamber 23 or chamber 24 by movement of the piston 22 from a position which activates the sensor 40 to a position which activates the sensor 38, or vice versa. This calibration process is improved by the control means and method described further hereinbelow.

Referring further to FIG. 1a, the prover calibration system includes a manifold 50 having branch conduits 52 and 54 in which spaced-apart shut-off valves 55a, 55b, 55c and 55d are interposed, as illustrated. A supply conduit 56 is connected to the conduit 52 by way of a control valve 58. Clean water is supplied to the manifold 50 byway of the conduit 56 from a storage tank 60 and a pump 62. Water displaced from the chambers 23 or 24 is conducted through the manifold conduit 54 to a return conduit 66 which is connected to a three-way solenoid operated valve 68. The valve 68 selectively discharges water to a calibration tank 70 or to the storage tank 60. The manifold 50 is connected to the prover displacement chambers 23 and 24 by way of conduits 72 and 74, respectively, each having an air purge valve 76 interposed wherein and respective temperature sensors 78 suitably connected thereto for measuring the temperature of the calibration water. A pressure gauge 80 is connected to the manifold inlet conduit 56 so that the pressure and temperature of water being used as the volumetric displacement liquid for calibrating the prover 10 may be determined to compensate for the specific volume of the liquid.

Control of the procedure for measuring the displaced volume of the chamber 23 or 24 during a prover calibration process is advantageously carried out by a unique controller, generally designated by the numeral 82 (FIG. 1b). The controller 82 is adapted to be mounted in a portable enclosure 84 and has a multi-conductor cable 86 adapted to be connected to the prover controller 42 with the respective conductors to be described further herein connected to the respective numbered terminals of the control interface part of the controller normally used for the water-draw procedure. The numbered terminals correspond to those provided on a waterdraw interface card for the controller 42 for the aforementioned Brooks-Compact Prover. A power supply cable connector 88 is provided for the enclosure 84 for supplying 120 v A.C. power to the controller 82. The controller 82 is also connected to the valve 68 by way of a two-conductor cable 90. Power input to the controller 82 is controlled by a single-pole, single-throw switch 92 which is in circuit with a suitable fuse 94. A power-on visual indicator 96 is in circuit with the power supply cable connector 88. A 3-32 v D.C. relay 98 is controlled to impose A.C. power on a solenoid-operated relay 100 which is connected to operate an audio signal indicator 102 and a visual indicator 104, which are operable to indicate when one or the other of the sensors 38 and 40 is activated by the flag 34 such as when the piston 22 moves from a starting position to the start of the calibration process. A drop-out control relay 106 is interconnected to the relay 100, as illustrated.

A relay 108 is provided for operation of the solenoid valve 68 and a relay 110 is interconnected to the relay 108 to provide drop-out control and to energize a visual indicator 112. The relay 110 is supplied with low-voltage D.C. power from numbered connectors 2 and 1 on the water draw interface card of the controller interface 42, as indicated. A visual indicator 114 is energized when the controller 82 and the prover 10 are undergoing a calibration measurement cycle.

The circuit of the controller 82 also includes a single-pole, momentary, normally open switch 116 which resets the relay 110 and the indicator 112. A second momentary normally open switch 118 also resets the indicator 112, the relay 110 and the relay 108. Single-pole, single-throw switch 120 is operable to select which edge 35 or 37 of the flag 34 is effective to start and stop the measurement cycle. Single-pole, single-throw switch 122 is operable to select which of the sensors 38 or 40 is operable to effect shut-off of the solenoid operated valve 68. Switches 124 and 126 are operable to effect operation of the valve 68. These switches may be of a type which have an actuator in a normally off position but may be thrown to a position which will effect energization or de-energization of a solenoid actuator for a valve such as the valve 68, depending on whether the valve is normally open or normally closed.

In the operation of the control system described and illustrated in the drawing, the controller 42 is energized and the cable 86 is connected to the prover controller interface card terminals illustrated. The manifold 50 is connected to the prover 10, the chambers 23 and 24 are filled with water, and air is vented through the vent valves 76 from each chamber. It may be advisable to move the prover piston 22 through an operating cycle to provide for venting all air from the prover chambers 23 and 24. In calibrating the prover 10 in the so-called downstream operating mode, that is calibrating the displaced volume of the chamber 23, the piston 22 is moved all the way upstream, to the right, viewing the drawing figure, and the controller 82 is connected to a source of 110 v A.C. power, not shown, through the connector 88. If a multi-port valve, such as the valve 68, is used, the switch 124 is moved to a position which will divert liquid flow into the storage tank 60 until flow is automatically switched to the calibration tank 70. Switch 120 is positioned to have the interface card provide a signal when the edge 35 passes the sensors 38 and 40. When the edge 35 of the flag 34 passes the sensor 40, the relay 110 receives a signal from controller 42 to shift relay 108, at which time valve 68 will automatically move to a position to begin filling the calibration tank 70. At this time, the switch 118 is momentarily actuated to reset the controller 42 and the indicator 112 will illuminate. When the flag 34 is moving between sensors 38 and 40, the indicator 114 will be illuminated. The audio indicator 102 may be adjusted as to tone level by selecting the setting of the resistor 103 with the switch 105 in the closed position. The indicators 102 and 104 are "on" when the flag 34 is moving from a starting position toward the sensors 38 and 40.

To move the piston 22 to the left, viewing the drawing figure, the valves 55a and 55d are closed, and valve 55b and 55c are opened to permit water to flow from the pump 62 to the conduit 74 and the chamber 24 while water in the chamber 23 flows through the conduit 72, the manifold 50 to the conduit 66 and into the calibration tank 70 through the valve 68. The piston 22 will move to the left until the edge 35 of the flag 34 passes the sensor 38. At this time, the controller 42 will effect shifting of the relay 108 to cause the valve 68 to divert flow back to the tank 60 so that a measured quantity of water only is collected in tank 70 as the piston 22 moves between the positions which corresponds to the edge 35 passing the sensor 40 and then the sensor 38. When the flag 34 passes the sensor 38, the relays will effect operation of the indicator 102, the visual indicator 104 as well as actuation of the valve 68. At this time, a measured quantity of liquid is present in the tank 70 to indicate the accuracy of the prover in the downstream calibration mode.

After calibrating the prover 10 in the so-called downstream mode, the valves 55a and 55b may be opened while valves 55d and 55c are closed so that water will flow from the pump 62 into the chamber 23 to move the piston 22 back to the right, viewing the drawing figure, so that a second calibration pass in the downstream mode may be made, if desired. During this process, water will flow out of the chamber 24 through the manifold 50 to the tank 60.

The system illustrated, including the controller 82, may also be used to calibrate the volume of chamber 24 by operation of the prover 10 to move in the opposite direction to that just described. Prior to calibrating the volume of chamber 24, the switches 120 and 122 are placed in the positions opposite to that selected for measuring the volume of chamber 23. Switch 118 is then momentarily actuated to reset the circuit of the controller 82 and its operation in conjunction with the controller 42. With the piston 22 in a position such that the flag 34 is to the left of the sensor 38, the valves 55a and 55d are open while the valves 55b and 55c are closed so that water will flow from the pump 62 to the chamber 23 and water will be displaced from the chamber 24 through the solenoid valve 68.

As the piston 22 is moved by water entering the chamber 23 toward the position so that the edge 35 of the flag 34 passes the sensor 38, the switch 116 is momentarily pressed to reset the relay 110. At the same time, the switch 120 should be closed so that the controller 42 will signal the controller 82 in response to the edge 35 passing the sensors 38 and 40, since the edge 35 is now in the "trailing" mode. When the flag edge 35 passes the sensor 38, the relay 110 will effect movement of the relay 108 to cause valve 6B to divert flow from chamber 24 into the tank 70. While the flag 34 is moving between sensors 38 and 40, the switch 116 is momentarily actuated to reset the indicator 112 and relay 110. The switch 122 is then moved to indicate the "second" sensor position. When the piston 22 moves to a position such that the flag edge 35 passes the sensor 40, the valve 68 will be switched to divert fluid from the measuring tank 70 to the tank 60. At this time, a measured quantity of water displaced from the chamber 24 may be determined from the contents of the tank 70. The valves 55a through 55d may then be switched to move the piston 22 back to a starting position for measuring the displaced volume of the chamber 24 in successive passes, if multiple measurements are desired.

Although a preferred embodiment of a flowmeter prover calibration controller and method have been described in detail herein, those skilled in the art will recognize that various substitutions and modifications may be made to the apparatus and the method without departing from the scope and spirit of the invention as recited in the appended claims.

What is claimed is:

1. A method for calibrating a flowmeter prover of a type having a cylinder and a piston disposed in said cylinder and dividing said cylinder into opposed fluid chambers, by moving said piston between a first position and a second position, to displace a quantity of liquid from said chambers, respectively, said prover, including sensor means for determining when said piston has moved to said first position and said second position and controller interface means for generating an electrical signal when said piston has moved to said first position and said second position, respectively, said method comprising the steps of:

providing a liquid-conducting manifold for conducting liquid from a source to one of said chambers and from the other of said chambers to a calibration tank, said manifold including a power-operated valve for controlling the flow of fluid to said calibration tank when said piston is moved between said first position and said second position;

providing controller means to effect operation of said power-operated valve to conduct liquid to said calibration tank only when said piston is moving between said first position and said second position;

operating said manifold to move said piston to a starting position for measuring a quantity of liquid to be displaced from said chamber when said piston moves between said first position and said second position;

operating said manifold to move said piston from said starting position to said first position;

causing said power-operated valve to operate in response to a signal received from said controller means when said piston passes said first position to commence displacing liquid from said chamber to said calibration tank; and causing said power-operated valve to operate in response to a signal from said controller means to shut off flow to said calibration tank when said piston reaches said second position so as to provide a measured quantity of liquid in said calibration tank corresponding to the volume of said chamber between said first position and said second position of said piston.

2. The method set forth in claim 1 wherein:

said controller means comprises means for controlling the operation of said power-operated valve when said piston moves from said second position to said first position and said method comprises the steps of:

operating said manifold to displace liquid from the other said chambers while displacing liquid into said one chamber to move said piston from a second starting position to said second position;

causing said power-operated valve to conduct liquid to said calibration tank when said piston moves from said second position to said first position; and causing said power-operated valve to interrupt the flow of liquid to said calibration tank when said piston reaches said first position.

3. The method set forth in claim 2 including the step of:

providing a signal when said piston is moving between a starting position and at least one of said first position and said second position.

4. The method set forth in claim 2 including the step of:

providing a signal when said piston has moved to a position to effect shutoff of liquid flow to said calibration tank.

5. The method set forth in claim 1 including the step of:

providing a visual signal of the condition of said piston when it is between said first position and said second position.

6. A system for calibrating a flowmeter prover of a type having a cylinder and a piston disposed in said cylinder and dividing said cylinder into opposed fluid chambers, said prover including sensor means for determining when said piston has moved between a first position an da second position to displace liquid from one of said chambers and controller interface means for generating an electrical signal when said piston has moved from said first position to said second position, respectively, said system comprising:

a liquid-conducting manifold, including conduit means for connection to said cylinder for supplying fluid to one of said chambers to displace said piston and fluid from the other of said chambers, said manifold including valve means for selectively conducting liquid to one of said chambers while simultaneously conducting liquid from the other of said chambers through said manifold;

a source of liquid connected to said manifold;

conduit means connected to said manifold and adapted to conduct liquid to a storage tank and to a calibration tank;

power-operated valve means interposed in said conduit means for selectively controlling the flow of liquid to said calibration tank and said storage tank, respectively;

controller means including means for connecting said controller means to said controller interface means for receiving signals from said controller interface means indicating the position of said piston with respect to said cylinder as determined by said sensor means, said controller means including indicator means for indicating the position of said piston with respect to aid sensor means during calibration of said prover and relay means for controlling the operation of said power-operated valve means to control the flow of liquid between said calibration tank and said storage tank in response to movement of said piston between said first position and said second position.

7. The system set forth in claim 6, including:

indicator means for indicating when said piston is moving from a starting position toward one of said first and second positions, respectively, and prior to actuation of said power-operated valve means to divert the flow of liquid to said calibration tank.

* * * * *